(12) United States Patent
Sloo

(10) Patent No.: US 7,379,879 B1
(45) Date of Patent: May 27, 2008

(54) INCIDENT REPORTING SYSTEM AND METHOD

(76) Inventor: Marshall A. Sloo, 2817 Irving Ave. S., Minneapolis, MN (US) 55408-1803

( * ) Notice: Subject to any disclaimer, the term of this patent is extended or adjusted under 35 U.S.C. 154(b) by 0 days.

(21) Appl. No.: 09/259,427

(22) Filed: Feb. 26, 1999

(51) Int. Cl.
*G06Q 30/00* (2006.01)

(52) U.S. Cl. .................. 705/1; 705/7; 705/8; 705/9; 705/10; 705/26; 705/27; 707/7; 707/10; 707/104

(58) Field of Classification Search .............. 705/1, 705/2, 3, 4, 7, 8, 9, 10, 26, 27; 345/326, 345/327; 709/245, 206, 7, 10, 104; 707/1, 707/2, 3, 4, 9, 11, 7, 104
See application file for complete search history.

(56) References Cited

U.S. PATENT DOCUMENTS

| | | | |
|---|---|---|---|
| 4,458,109 A | | 7/1984 | Mueller-Schloer |
| 4,582,959 A | | 4/1986 | Mylinski et al. |
| 4,750,119 A | | 6/1988 | Cohen et al. |
| 4,972,461 A | | 11/1990 | Brown et al. |
| 5,040,141 A | | 8/1991 | Yazima et al. |
| 5,185,697 A | * | 2/1993 | Jacobs et al. ............... 705/1 |
| 5,216,603 A | | 6/1993 | Flores et al. |
| 5,253,165 A | | 10/1993 | Leiseca et al. |
| 5,293,250 A | | 3/1994 | Okumura et al. |
| 5,483,442 A | * | 1/1996 | Black et al. ............... 705/2 |
| 5,495,412 A | | 2/1996 | Thiessen |
| 5,510,978 A | * | 4/1996 | Colgan ................... 705/7 |
| 5,535,383 A | | 7/1996 | Gower |
| 5,668,953 A | | 9/1997 | Sloo |
| 5,758,328 A | * | 5/1998 | Giovannoli ............... 705/26 |
| 5,812,795 A | * | 9/1998 | Horovitz et al. ........... 709/245 |
| 5,983,238 A | * | 11/1999 | Becker et al. ............. 707/104 |
| 6,043,813 A | * | 3/2000 | Stickney et al. ........... 345/326 |
| 6,065,000 A | * | 5/2000 | Jensen .................... 705/3 |
| 6,173,284 B1 | * | 1/2001 | Brown .................... 707/10 |
| 6,178,413 B1 | * | 1/2001 | Costin .................... 707/1 |
| 6,405,213 B1 | * | 6/2002 | Layson et al. ........... 707/104.1 |
| 7,330,817 B1 | * | 2/2008 | Exall et al. ............... 705/1 |
| 2002/0116247 A1 | * | 8/2002 | Tucker et al. ............. 705/8 |
| 2002/0143595 A1 | * | 10/2002 | Frank et al. .............. 705/8 |
| 2003/0088645 A1 | * | 5/2003 | Ferraro .................. 709/218 |

OTHER PUBLICATIONS

"BBC: BBC Online offers free tours of Albert Square, Ambridge and Teletubbyland 24 hours a day", M2 PressWire, May 5, 1998.*
Hanrahan, "The Elctronic Handshake", FBI Law Enforcement Bulletin, vol. 66 issue 5, May 1997.*
Mannix, "Have I Got A Deal For You!", U.S. News & World Report, vol. 123 issue 16, Oct. 27, 1997.*

(Continued)

*Primary Examiner*—Nga B. Nguyen
(74) *Attorney, Agent, or Firm*—Hovey Williams LLP

(57) ABSTRACT

A computer-based method of collecting and processing incident reports received from witnesses who observe incidents such as criminal acts and legal violations. The method automates the collection and processing of the incident reports and automatically sends the incident reports to the appropriate authority so that the observed incidents can be acted on in an appropriate manner.

20 Claims, 2 Drawing Sheets

OTHER PUBLICATIONS

Figure 1:
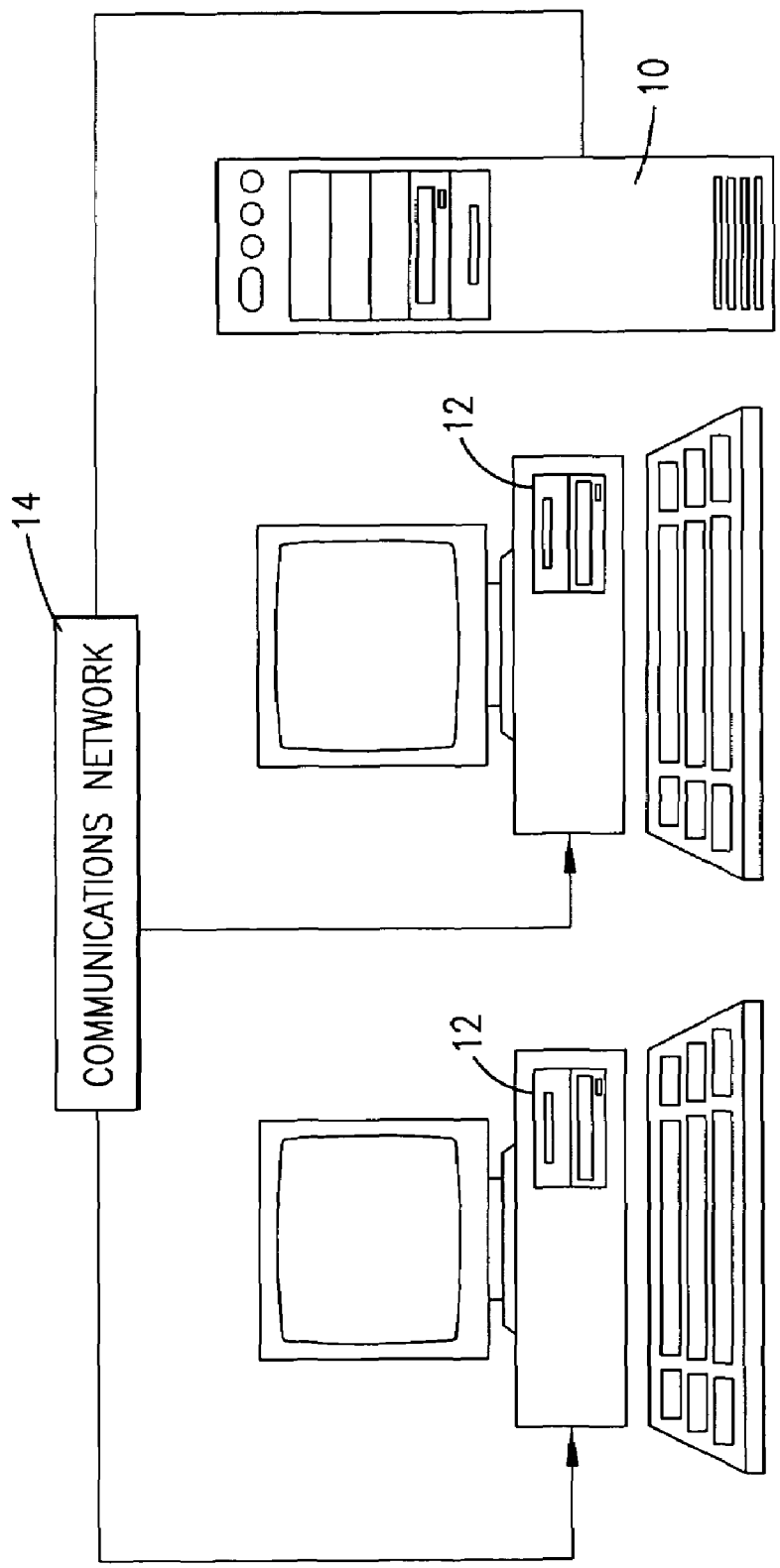

Scott Maier, "Long Arm of Law is Going online Internet Helps police do Their Job", The Seattle Post Intelligencer, Aug. 6, 1996, pag. A1.*

Alex Rodriguez, "Local Police slowly Exploring its Users/ Police forces are slowly exploring users if Internet", Chicago Sun Times, Jul. 16, 1996, p. 8.*

Carlos Campos, "911 Steps up to Computer-Aided Dispatch System is Expected to Cut Response Time", The Atlanta Journal-Constitution, Apr. 10, 1996, p. J.01.*

Stockweather et al., "Two Oregon Companies Implement Most Advanced Computer-Aided-Dispatch and Tracking System for Emergency Services in City of Detroit", Oct. 17, 1988, Sec. 1, p. 1.*

The Better Business Bureau Web Server for U.S. and Canada—BBB Services Online, dated Mar. 23, 1997.

The National Consumer Complaint Center—sponsored by The Alexander Law Firm—dated Mar. 23, 1997.

"Get It Straight From the Customer"—94-18615; dated Mar. 9, 2000 from Dialog (R) File, Anonymous.

Data-Star Loads European financial, company, contract data, medical, health and pharmaceutical files Database Searcher, v8, n8, p. 10(4), Oct. 1992.

Escott et a. v. Barchris Construction Corporation, 283 F.Supp. 643; 2 A.L.R. Fed. 86, dated Mar. 29, 1968.

* cited by examiner

INCIDENT REPORTING SYSTEM AND METHOD

BACKGROUND OF THE INVENTION

1. Field of the Invention

The present invention relates to a computer-based method of collecting and processing incident reports filed by witnesses who observe incidents such as criminal acts and legal violations. The method automates the collection and processing of the incident reports and automatically sends the incident reports to the appropriate authority so that the observed incidents can be acted on in an appropriate manner.

2. Description of the Prior Art

Citizens frequently observe criminal acts, legal violations, and other incidents that they wish to report to the appropriate authority or authorities. However, many people do not know who the appropriate authority is or how to contact them and therefore either report the incident to the wrong authority or fail to report the incident at all. Even when people know who the appropriate authority is, they often decide not to report their observations for fear of getting involved in a criminal matter.

The 911 emergency telephone system has been developed in the United States to provide a convenient way for citizens to report emergencies. However, this system is intended for use in emergencies only, not for reporting incidents in general. Moreover, the 911 system is geographically limited in that each city or zone in the country must set up and operate its own emergency phone system. Moreover, 911 systems are expensive to operate because they rely upon human operators. Another problem with reporting incidents by telephone is that witnesses often fail to provide complete information about their observations because they are excited or in a hurry, making it difficult for the appropriate authority to accurately act on the observations.

OBJECTS AND SUMMARY OF THE INVENTION

The present invention solves the above-described problems and provides a distinct advance in the art by providing a computer-based method for receiving, collecting, and processing incident reports provided by witnesses. The method broadly includes the steps of receiving into a computer system an incident report from a witness who observed an incident committed by an offender; prompting the witness to provide certain types of information about the incident; selecting an appropriate authority to whom the incident report should be sent; and sending the incident report to the selected authority so that the authority can respond to the incident report. In preferred forms, additional information is added to the incident report either automatically by the computer system, by the authority to whom the incident report was sent, or by other persons who are allowed to access the incident report by way of a publicly searchable database.

The present invention encourages witnesses to submit incident reports because it allows them to remain anonymous and does not require them to know or identify to whom the incident report should be sent. Moreover, the invention improves the accuracy of incident reports because it does not rely upon human operators to collect the information and automatically prompts the witness to provide certain types of information about the incident that is needed to properly act on the incident. The invention further improves the reporting and processing of incidents by adding additional information to the incident report from other sources based on the information entered into the report by the witness to automatically obtain a more complete report of the incident.

BRIEF DESCRIPTION OF THE DRAWING FIGURES

Figure 2:
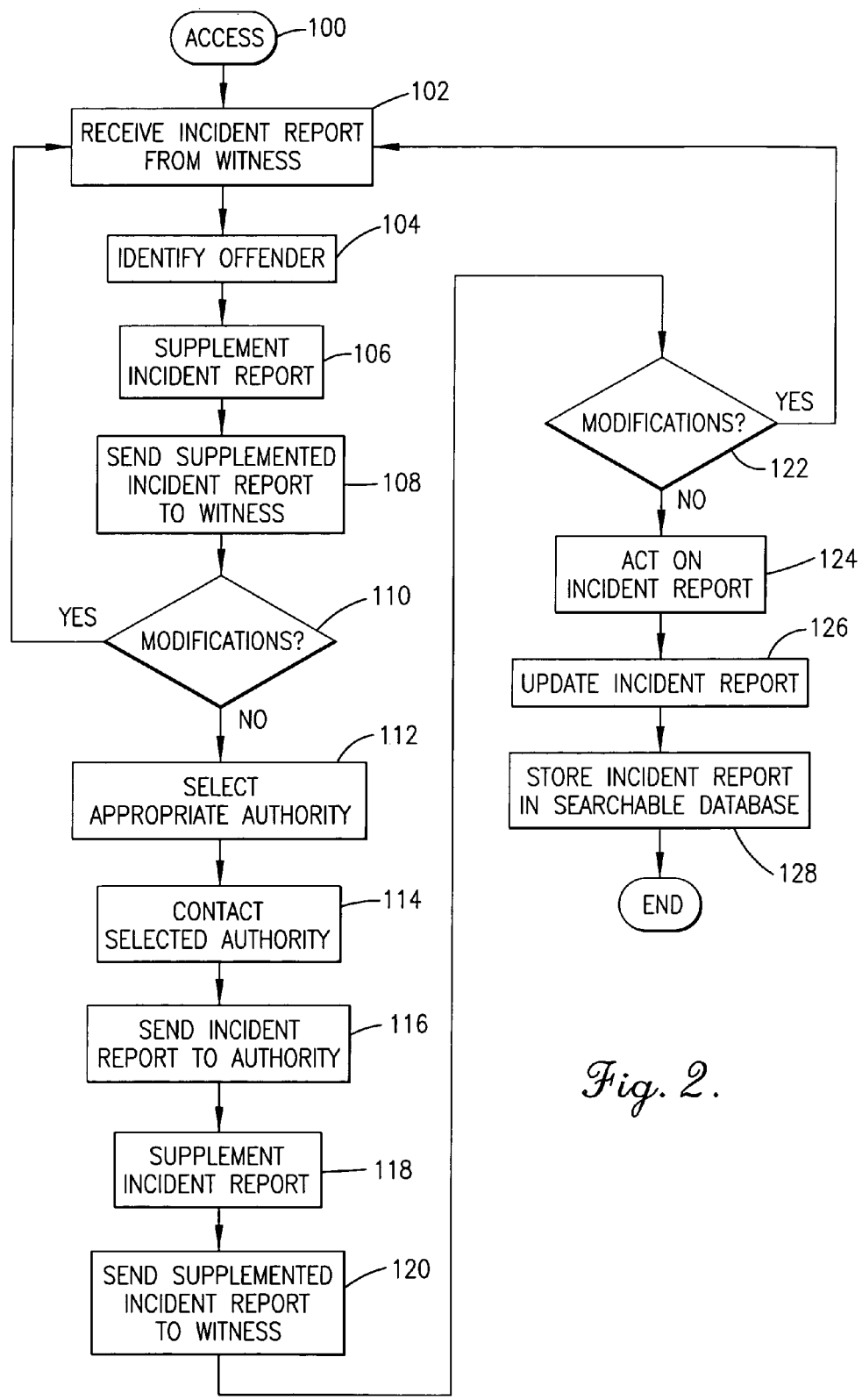

A preferred embodiment of the present invention is described in detail below with reference to the attached drawing figures, wherein:

FIG. 1 is a schematic representation of computer and communications equipment used to implement some of the steps of the present invention; and FIG. 2 is a flow chart illustrating the primary steps of the invention.

DETAILED DESCRIPTION OF THE PREFERRED EMBODIMENTS

As illustrated in FIG. 1, the method of the present invention is preferably implemented with a central computer 10, a plurality of user computers 12, and a communications network 14 for routing communications therebetween. The central computer is preferably a conventional file-server microcomputer such as those manufactured by Digital Equipment Corporation. The central computer includes conventional memory, input and output ports, and a modem or other communication device and is operable for receiving, storing and retrieving data and files as described below.

The user computers 12 are preferably personal computers such as IBM compatible microcomputers containing Intel Pentium type microprocessors but may also be "dumb" terminals with communication capabilities. Each user computer includes conventional memory, input and output ports, a modem and software for communicating with and interpreting data sent from the central computer 10. Those skilled in the art will appreciate that any number of user computers may be used with the present invention.

The communications network 14 is preferably a conventional telecommunications network including a plurality of switches connected to corresponding local exchange carriers. The network may also be a local area network, wide area network, wireless network, voice network, or any other type of network operable for coupling the user computers 12 to the central computer 10. Private communications may be encrypted or otherwise protected before being transmitted over the communications network using available technology.

Those skilled in the art will appreciate that the method of the present invention may be implemented with virtually all types of hardware and that the preferred central computer 10, user computers 12 and communications network 14 are described merely to set forth one best mode of the invention.

The method of the present invention is preferably implemented with a computer program that controls the operation of the central computer 10. The computer program may be stored in the read-only-memory (ROM) or hard drive memory of the central computer or on conventional external disks for transfer to the memory of the central computer. The data records including the incident reports associated with the method of the present invention are preferably stored in the hard drive memory of the central computer.

The computer program interface is preferably written in a Standard Generalized Mark-up Language (SGML) such as Hypertext language. The mark-up language cooperates with a standard server language such as Common Gateway Interface (CGI) or Practical Extraction and Report Language (PERL) for handling the various operating functions of the central computer 10. Those skilled in the art will appreciate that the computer program can be written in other computer languages as a matter of design choice.

The steps in the method of the present invention are broadly illustrated in FIG. 2. The method permits a person who witnesses an incident to report the incident so that it can be acted on by the appropriate authority. The incident may be a criminal act such as the commission of a robbery, a legal violation such as a traffic violation, a consumer offense such as the sale of a defective product or the rendering of an unsatisfactory service by a business or restaurant, or any other observation made by a witness that the witness wishes to report. As described below, several witnesses may report information regarding the same incident.

The method begins when a witness uses one of the user computers 12 to contact the central computer 10 via the communication network 14 to report an incident. The initial access depicted in step 100 may include conventional log-on or connection for data transfer procedures. The central computer 10 then displays or transmits an initial message to the appropriate user computer 12 describing the function and capabilities of the automated incident reporting system.

The computer program operating the central computer 10 next prompts the witness to fill out a complete incident report so that the central computer can process the report as depicted in step 102. For example, the program preferably prompts the witness to enter the time and date the incident occurred, a full description of the incident, several key words that best describe the incident such as "robbery", "speeding violation", or "bad service", the exact or general location of the incident, and an indication of whether physical or financial harm was done to the witness or others. The program may also prompt the witness to identify which law or rule the witness believes was violated as a result of the incident, or the program may automatically identify which law or rule was violated based on the other information entered by the witness or from other information such as information from past incident reports or even data that is collected independently by the system such as by video surveillance equipment.

The program also preferably prompts the witness to identify any other potential witnesses who may also have observed the incident. If other potential witnesses are identified, the central computer attempts to contact them via the communications network and requests that they complete a separate incident report as described above. If other potential witnesses submit additional incident reports, all of the incident reports are combined into a single case as described in more detail below.

To encourage the entry of accurate and honest information, the program may also ask the witness if he or she is willing to testify that the entered information is true and accurate and asks the witness if he or she is willing to be contacted about the incident report. To encourage the use of the incident reporting system by persons who do not wish to be known, the program also allows witnesses to remain anonymous, to designate portions of their witness report that they do not want disclosed to others, or to identify certain persons such as the perpetrator of the incident who they do not want to allow access to the incident report.

After the incident report has been fully completed, the program next prompts the witness to identify the offender or perpetrator of the incident as depicted in step 104. For example, when the incident is a criminal act or legal violation committed by an offender, the program preferably prompts the witness to enter identifying information such as the offender's name, address, physical description, license plate number, phone number, etc. Similarly, when the witness is a complaint against a company or other entity, the program preferably prompts the witness to enter identifying information such as the company's name, address, phone number, etc.

The program then attempts to make a positive identification of the offender based on the information entered by the witness. For example, if the witness enters the name and address of the offender, the central computer may access proprietary or publicly available databases such as phone directories, government databases, or Internet directories to confirm that the identified offender actually exists and that the information entered by the witness is accurate. The program may also use the information entered by the witness to collect additional identification information from these databases to supplement the incident report as depicted in step 106. If additional information is found, the program displays the information to the witness and prompts the witness to confirm that the correct person has been identified.

If the witness was not able to enter the name, address, or other information that would permit a positive identification of the offender, the program may access the above-described databases in an attempt to gather additional information that would permit a positive identification. For example, if the witness merely entered physical description information and the general vicinity of the incident, the program may search databases to identify persons who match the physical description and that live in the general vicinity of the incident. The program then displays a list of all persons matching the entered description, possibly including photographs of the persons, and asks the witness if any of the persons is the offender.

Even if the witness does not enter enough information and the program cannot discover enough additional information to permit a positive identification of the offender, the above identification processes are performed to obtain as much information as possible regarding the offender and to possibly narrow the list to include certain characteristics. For example, the identification process may narrow the list of suspected offenders to include only Caucasian males between the ages of 30 and 40 that are under 6' tall. As described in more detail below, this information may be used in connection with other information to make a positive identification of the offender.

The program may also supplement the incident report with other useful information such as addresses, names, etc. For example, if the witness reported an incident involving a company in a particular city but did not know the exact address and phone number of the company, the program may search the above-described databases to obtain the exact addresses and phone number of the company.

Each time the program supplements the incident report, the central computer 10 sends the supplemented incident report to the witness so that the witness can once again verify the accuracy of the report as depicted in step 108. If the witness wishes to further modify the report, the steps described above may be repeated as depicted in step 110.

After the witness and the program have entered all possible information into the incident report, the authority to whom the incident report should be sent is selected as depicted in step 112. The authority may be a local police department or prosecutors office, the FBI, CIA or other federal or governmental agency, a consumer group like the Better Business Bureau or any other group or agency that regularly receives such information.

The authority may be selected by the witness, automatically by the program, or a combination of the two. For example, if the witness observes a criminal activity such as a robbery, he or she may request that the incident report be sent to the local police. Or, if the witness does not know who the appropriate authority is, the program may automatically select the authority based on the information entered by the witness. For example, if the incident report involves a traffic violation, the program may automatically send the report to the traffic violations bureau of the local police. Similarly, if the witness requests to send the incident report to a particular authority such as the local police, the program may evaluate the information entered by the witness and determine that the incident report should also be sent to another authority such as the FBI.

The program next contacts the appropriate authority via the communications network 14 and sends or otherwise makes the incident report available to the authority as depicted in steps 114 and 116. The authority may then supplement the incident report based on the information entered by the witness and the program to make the incident report more complete as depicted in step 118. The supplemented information may include information that is contained in proprietary databases available only to the authorities.

In addition to notifying specific authorities, the program may enable a witness to indicate that their report may be accessible by any and all qualified authorities. Interested authorities can then search the program for any and all reports that they are qualified to receive.

After the authority has supplemented the incident report, the authority is requested to send the supplemented report back to the central computer 10. Alternatively, the authority may be requested to supplement the report while on-line with the central computer 10 so that the master copy of the incident report always remains on the central computer. The central computer then sends or otherwise makes available to the witness the supplemented incident report as depicted in step 120 so that the witness can once again verify the accuracy of the report, especially the supplemented information. If the witness wishes to further modify the report, the steps described above may be repeated as depicted in step 122.

The authority then acts upon the incident report in a conventional manner as depicted by step 124. For example, the authority may build a case against the offender and arrest or penalize the offender once the authority has sufficient information and believes that the incident report involves a punishable matter.

The central computer 10 periodically contacts the authority through the communication network 14 to inquire whether the authority has acted on the incident report and to obtain information regarding the action taken. This information is then added to the incident report as depicted in step 126. The program and the central computer 10 may also allow authorities to rule or take action on an incident report while on-line. For example, if the selected authority is a police officer or judge, that police officer or judge can review the incident report along with all other supporting reports as described below and then post a decision or issue an arrest warrant that is posted on a file in the central computer.

The program may also prompt the authority to enter a fine or judgment against the offending party in response to the authority's decision regarding the incident report. The program then automatically contacts the offending party and instructs the offending party how to pay the fine or meet the obligations of the judgment. The program may post the fine or judgment on a publicly searchable database as described below and may monitor whether the fine is paid or judgment is satisfied. If the offender who must pay the fine is a registered user as described below, the program may automatically debit the user's account in the amount of the fine.

The central computer 10 and corresponding program are also configured to permit third parties to obtain information about incidents reported by witnesses. To this end, and as depicted in step 128, the central computer stores incident reports in a publicly-searchable database to enable persons to monitor incidents in their communities and to encourage more witnesses to add information to an incident report. For example, if numerous persons witness an incident, the first witness to access the central computer 10 will file an incident report as described above. Then, as additional witnesses access the central computer to file an incident report, the central computer will recognize, based on the information entered, that the new incident reports involve the same incident as the first filed incident report. The central computer will then combine the information entered by the various witnesses into a single case and then allow all the witnesses to access the information in the case. This results in a more complete description of the incident because the information entered by one witness may refresh the memory of another, and vice versa, thus resulting in more accurate and complete incident reports.

The central computer 10 and corresponding computer program may also provide a warning system that alerts users to certain dangerous conditions based on incident reports and other information that has been previously entered and stored into the system. For example, if numerous incident reports have been filed regarding criminal activities in a certain geographic area, the central computer identifies this trend and posts a notice on a searchable database alerting persons who access the central computer to avoid the geographical area.

The computer program is also configured to encourage or discourage witnesses from submitting reports by predicting the outcome of an incident before the incident has actually been handled by a selected authority. To this end, the computer program may compare the information entered into an incident report to the information entered into past incident reports that have already been resolved. If the new incident report has similar facts as past incident reports, the program alerts the witness that he or she is likely to obtain a similar outcome as the past, similar incidents.

In addition to allowing and encouraging witnesses to file incident reports, the present invention may obtain information regarding incidents by other means such as with surveillance cameras to supplement the incident reports and to provide confirmation of the observations of the witnesses. Use of video surveillance for compilation of information allows the gathering of information without requiring disclosure of certain personal information to other users. For example, a witness may be equipped with a video input system such as a personal surveillance camera and a display. When the witness encounters an incident such as a suspect committing a crime, the video input system would automatically recognize the suspect from the video input and could then display records for the suspect on the witness's hand held readout without revealing the suspect's identity. The witness would not need to know the identity of the suspect to observe the incident relating to the suspect. Such a system may overcome some of the problems associated with publicly revealing personal data.

To encourage the input of accurate and honest information regarding incidents, the central computer 10 may require that witnesses become registered users of the system before submitting incident reports. This permits the central computer to monitor and evaluate the submission of incident reports by each registered user to determine if any particular witness is filing false or misleading reports. For example, if a registered user continually files incident reports containing facts that cannot be verified or confirmed, the central computer may restrict that user's access to the system. The central computer and corresponding program may also calculate and record success rates or validity ratings for each user of the system and post these ratings in the searchable database to enable third parties and the selected authorities to assess the credibility of reports or other information reported by each particular user.

The program may also rate authorities based on their actions or responses to incident reports to encourage them to participate in this system. Users of the system other than authorities may be prompted by the program to rate or indicate their satisfaction level with authorities and this information may be posted on the publicly searchable database to encourage accurate an honest participation by the authorities.

Users may register with the central computer and still remain anonymous by being assigned a code or password. The code or password must be tied to some official identification such as the user's social security number so that the user cannot simply request new codes or passwords; however, the official identification is not provided to others accessing the central computer including the authorities and the other users of the system.

The central computer 10 and the corresponding computer program may provide private and anonymous communication between users of the system. For example, the system may include e-mail evidence capabilities that enable certified and anonymous communication between users that can be used as evidence to support an incident report or case. To provide accurate witnessing of reports, users who utilize the communication will have their regular e-mail address correspondence detoured through the system so that the central computer can identify the real e-mail address of the users. The central computer and corresponding program may also provide an "action processing interface" that is accessible only by authorities who have registered with the central computer. These authorities can access this interface and add notes and other communications to incident reports to assist the authority that is selected to respond to the incident reports as discussed above. A similar interface may be provided to allow other participants to add notes and other information to assist the select authority in responding to an incident report.

The central computer 10 preferably records the exact date and time that all incident reports and other data is entered so that the date and time of the information is certified by the central computer. Users may be charged a fee for submitting an incident report. This fee may be charged up-front or deducted from a user's account or shown in the account as due for later payment. Similarly, the system may pay rewards to users for the submission of certain types of incident reports. For example, if the authorities indicate that certain information that was submitted by a user was helpful in resolving a case, the central computer 10 may credit an award to the user's account. This reward may be posted on the central computer 10 before such information is submitted to encourage collection of the information. The rewards may be offered by anyone, including crime victims, authorities, or the operator of the system of the present invention.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A computer-based method of collecting and processing incidents observed by witnesses comprising the steps of:
    receiving into a computer system an incident report directly from a witness who observed an incident committed by an offender;
    prompting the witness to provide certain types of information about the incident;
    prompting the witness to identify other witnesses, wherein a central computer attempts to contact the other witnesses via a communications network to request further information about an incident;
    selecting an authority to whom the incident report should be sent, wherein the authority is selected based at least in part on information provided by the witness and wherein the authority is automatically selected by the computer system based on information entered into the incident report by the witness; and
    sending the incident report to the authority so that the authority can respond to the incident report.

2. The method as set forth in claim 1, the incident being selected from the group consisting of a criminal act, a legal violation, a sale of a defective product, and a rendering of unsatisfactory service.

3. The method as set forth in claim 1, further including the step of prompting the witness to enter into the incident report identification information identifying the offender.

4. The method as set forth in claim 1, further including the step of receiving additional identification information identifying the offender and adding the additional identification information to the incident report.

5. The method as set forth in claim 4, the additional information being obtained by searching files accessible by the computer system based on the identification information entered by the witness.

6. The method as set forth in claim 4, the additional information being obtained by receiving the additional information from the authority based on the information entered by the witness.

7. The method as set forth in claim 1, wherein the authority is an agency selected from the group consisting of a local police department, a local prosecutors office, the Federal Bureau of Investigation, the Central Intelligence Agency.

8. The method as set forth in claim 1, wherein the authority is a governmental agency rather than an individual agent representing the agency.

9. The method as set forth in claim 1, further including the step of receiving into the computer system an action report from the authority explaining the action the authority took in response to the incident report.

10. The method as set forth in claim 9, further including the step of storing the action report along with the incident report in a file accessible by the computer system.

11. The method as set forth in claim 1, wherein the incident reports from a plurality of different witnesses are received in the computer system.

12. The method as set forth in claim 11, further including the step of storing the incident reports in a searchable database; and providing a warning system that alerts users to certain dangerous conditions based on incident reports.

13. The method as set forth in claim 12, further including the step of permitting persons to access the searchable database to view the incident reports.

14. The method as set forth in claim 13, further including the step of receiving additional incident information from the persons that access the searchable database and adding the additional incident information to the incident reports to assist the authorities.

15. The method as set forth in claim 14, further including the step of sending the additional identification information to the witness.

16. The method as set forth in claim 15, further including the step of prompting the witness to update the incident report based on the additional identification information.

17. A computer-based method of collecting and processing incidents observed by witnesses comprising the steps of:
receiving into a computer system an incident report directly from a witness who observed an incident committed by an offender;
prompting the witness to enter certain types of information about the incident into the computer system, the information including identification information identifying the offender;
prompting the witness to identify other witnesses, wherein a central computer attempts to contact the other witnesses via a communications network to request further information about an incident;
selecting an authority to whom the incident report should be sent, wherein the authority is selected based at least in part on information entered by the witness and wherein the authority is selected by the computer system based on information entered into the incident report by the witness; and
sending the incident report to the authority so that the authority can respond to the incident report.

18. The method as set forth in claim 17, wherein the authority is a governmental agency rather than an individual agent representing the agency.

19. The method as set forth in claim 17, further including the steps of receiving an action report from the authority explaining what action was taken in response to the incident report and allowing the witness to view the action report.

20. A computer-based method of collecting and processing incidents observed by witnesses comprising the steps of:
receiving into a computer system an incident report directly from a witness who observed an incident committed by an offender, wherein the witness does not know to whom the incident report should be sent;
prompting the witness to enter certain types of information about the incident into the computer system, the information including identification information identifying the offender;
prompting the witness to identify other witnesses, wherein a central computer attempts to contact the other witnesses via a communications network to request further information about an incident;
selecting an authority to whom the incident report should be sent, wherein the authority is selected by the computer system based at least in part on information entered by the witness;
sending the incident report to the authority so that the authority can respond to the incident report;
providing a warning system that alerts users to certain dangerous conditions based on incident reports;
receiving an action report from the authority explaining what action was taken in response to the incident report; and
storing the action report in a searchable database.

* * * * *